Jan. 4, 1927. 1,613,249
A. SEGUIN
SPEEDOMETER
Filed Dec. 24, 1924 2 Sheets-Sheet 1
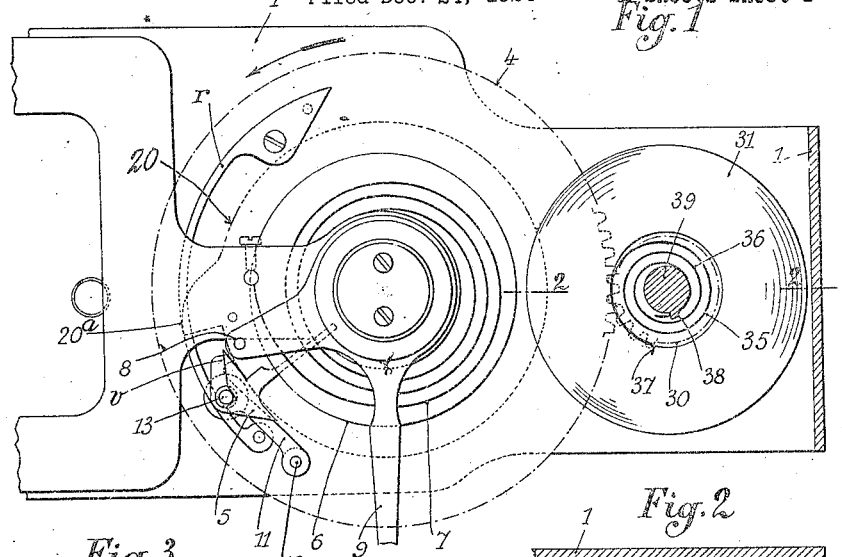
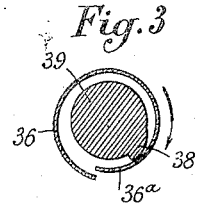
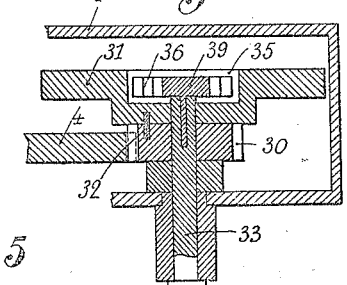
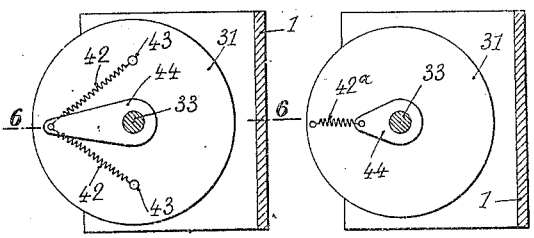
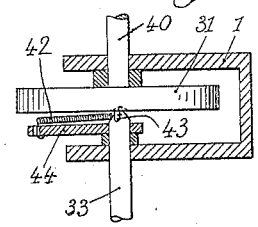
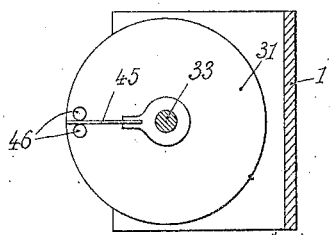
Augustin Seguin,
INVENTOR;
By Otto Numbe
his Attorney.

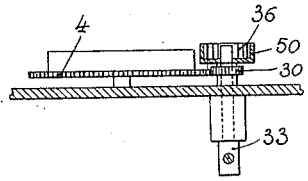
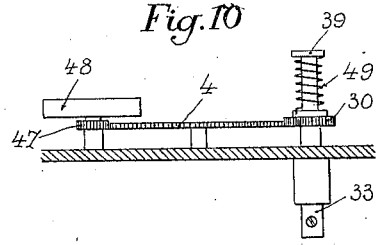
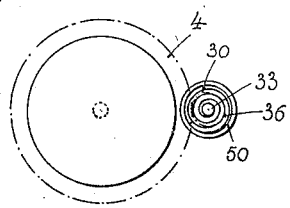
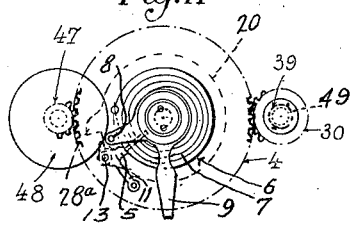

Patented Jan. 4, 1927.

UNITED STATES PATENT OFFICE.

1,613,249

AUGUSTIN SEGUIN, OF PARIS, FRANCE.

SPEEDOMETER.

Application filed December 24, 1924, Serial No. 757,832, and in France January 25, 1924.

The present invention relates to improvements in speed indicators and like apparatus, said improvements being particularly designed for use with speed indicators of the type in which certain elements have a periodic reaction, and with considerable force, upon the element driving the apparatus; such reactions may in certain cases set up vibrations in the said driving element, for instance in the flexible cable, which render the apparatus unstable or may even cause incorrect indications.

The invention has for its object to reduce and even to eliminate the detrimental effects of such reactions, and it is chiefly characterized in that the speed indicator is actuated through the medium of a flywheel which is itself rotated by the member driving the apparatus and is connected thereto through the medium of an elastic coupling.

In these conditions the mutual reactions of the elements of the speed indicator, which tend to be imparted to the driving elements, for instance to the flexible cable, are absorbed by virtue of the inertia of the flywheel and the elastic coupling.

Obviously, this arrangement will also absorb the abrupt and irregular variations which are due to the elements transmitting the motion, the speed of which latter is to be measured, and which are of frequent occurrence with the use of flexible transmission means.

In the appended drawings, shown by way of example:

Fig. 1 is a plan view of an embodiment of the invention, which is illustrated in connection with a speed indicator of the type disclosed in my prior Patent No. 1,499,881.

Fig. 2 is a section on the line 2—2 of Fig. 1.

Fig. 3 is a detail view of a one way connection between the elastic coupling and the driving member.

Fig. 4 is a plan view of a coupling device embodying a coil spring.

Fig. 5 shows a modification of the same.

Fig. 6 is a section on the line 6—6 of Fig. 4.

Fig. 7 is a plan view of a coupling device embodying a spring strip.

Fig. 8 is an elevation of a modification, partly in section.

Fig. 9 is the corresponding plan view.

Fig. 10 is an elevation of a further modification.

Fig. 11 is the corresponding plan view.

The speed indicator is itself constructed as specified in my above mentioned prior specification, i. e. comprises a driving wheel 4 and a balance wheel 6 provided with a spiral spring 7 mounted upon the frame 1. The wheel 4 is rotated by the pinion 30 in a continuous manner and at a speed proportional to the speed to be measured; said wheel carries the lever 11 which is pivoted thereto at 12 and is constantly urged inwardly by the spring $r$. The said lever carries a stud 13 which is perpendicular to its plane and whereof the portion extending below the said lever co-operates with the fixed cam 20. A striker 5 which is connected by friction to the balance wheel 6 may be drawn forward together with the same by the wheel 4 when the stud 13 is in contact therewith, Fig. 1, but when a projection $20^a$ of the said cam 20 raises the lever 11, the stud 13 releases the striker 5 and the balance wheel 6, which return backward under the action of the spring 7. The indicating pointer 9 is provided with the arm 8 which is perpendicular to the plane of the figure and may be actuated either by the hook $v$ of the pivoted lever 11 in the direction of rotation of the wheel 4 or by the striker 5 in the contrary direction. It is specified in my said prior specification that when the striker rotates backward together with balance wheel under the action of the spiral spring 7, and thus encounters the stud 13 which is in continuous rotation at a speed proportional to the speed to be measured, the arm 8 of the indicating pointer will be thus released from the striker 5 and the lever 11 and will remain stationary, so that its position may serve for indicating the speed to be measured.

But when the said striker encounters the stud 13, which parts are rotating in opposite directions, a shock will necessarily take place which will depend upon the speeds of rotation of the said parts; this shock upon the stud 13 can be imparted by the lever 11 to the wheel 4 and thence to the pinion 30 and to the flexible cable usually operating the latter, and due to the flexibility of the said cable, a jarring effect may be set up which is detrimental to the operation of the device.

To eliminate such vibrations, a flywheel 31 is secured to the pinion 30 by the studs 32; said flywheel is rotatable upon one end of the shaft 33 whereof the other end is connected to the flexible cable 34 imparting the motion whose speed is to be measured. A recess 35 is formed in said flywheel serving as a barrel for the volute spring 36 whose end 37 is attached to or is in friction contact with the flywheel, as will be further specified; said spring is secured at its inner end to the hooked end 38 of a nib 39 provided on the end of the flywheel shaft 33.

In these conditions, the flexible cable 34 being connected to the pinion 30 and to the driving wheel 4 through the medium of the said flywheel and the spring 36, all the reactions produced when the striker 5 meets with the stud 13 will be taken up by the inertia of the flywheel and spring, and hence will not be transmitted to the flexible cable, and the latter will keep its regular movement of control.

The construction above set forth is given solely by way of example, and the device according to the invention may be constructed in all suitable forms in which the inertia of a flywheel is employed in combination with the elasticity of an elastic element.

For instance in the coupling device shown in Figs. 4 and 6, 1 is the frame of the apparatus, 31 the flywheel and 33 the shaft operated by the flexible cable; 40 is the shaft imparting this motion to the speed indicator. The coupling means herein consist of two coil springs 42 which are connected at one end to the flywheel 31 by the two studs 43 and at the other end to an arm 44 which is secured to the shaft 33. In Fig. 5, a single spring 42ᵃ is employed, and in Fig. 7, the elastic connection consists of a spring strip 45 mounted on the shaft 33 and actuating the flywheel by means of the two studs 46. It is obvious that the devices shown in Figs. 4 to 7 operate in the same manner as the device shown in Figs. 1 and 2.

In the case of Figs. 1 and 2, the spring 36 may be connected at one end to the nib 39 and at the other to the flywheel 31, or the connection can be made through the medium of a one way device, so that the motion is transmitted only in one direction. The said one way device may simply consist of the projection 38 of the nib 39 and an aperture 36ᵃ formed in the said spring as shown in Fig. 3; the spring might also be connected to the flywheel through the medium of a friction arrangement which can be made to slip in the event of an abrupt reaction due to the wheel 4.

The weight of the flywheel 31 and the force of the spring or springs will obviously be determined according to the maximum reactions which may occur between the tappet 5 and the stud 13 (i. e. the wheel 4).

The flywheel and the elastic coupling element have not necessarily a direct relation to each other. In Fig. 8 the gear wheel 4 is sufficiently heavy to form a flywheel having the function of the flywheel 31 in Figs. 1 to 7. In the arrangement shown in Fig. 8, the spring 36 constituting the elastic coupling is mounted in the barrel 50 which has no operative weight and is secured to the pinion 30 actuating the gear wheel 4, the inner end of said spring being secured to the shaft 33.

Since the elastic connecting element is in all cases distinct from the flywheel, the latter may be actuated by the gear wheel 4, for instance by a speed-increasing pinion 47, Figs. 10 and 11; with this arrangement, the speed of the flywheel 48 can be increased, and its size may thus be reduced. Figs. 10 and 11 also show the elastic coupling consisting of a helical spring 49 whereof one end is attached to the member 39 secured to the driving shaft 33 and the other to the pinion 30.

In general, if, in a speed indicator, any one of the elements concerned in the normal operation of the apparatus possesses a sufficient inertia to act in the same manner as the flywheel 31, it will be simply necessary to provide the same with elastic connecting means analogous to what has been above described, and in direct relation (or not) with the same, in order to carry out the invention.

Having now described my invention, what I claim as new and desire to secure by Letters Patent is:

1. With a speed indicator of the type comprising a wheel adapted to rotate in a continuous manner and in a constant direction, a balance wheel urged by a spiral spring in the reverse direction and two elements one of which is driven by said continuously rotating wheel and the other by said balance wheel, and adapted to periodically impact against each other, the combination of a continuously rotating driving member, a flywheel connected to the indicator and an elastic coupling adapted to transmit the motion to be measured from said driving member to said continuously rotating wheel.

2. With a speed indicator of the type comprising a wheel adapted to rotate in a continuous manner and in a constant direction, a balance wheel urged by a spiral spring in the reverse direction and two elements one of which is driven by said continuously rotating wheel and the other by said balance wheel, and adapted to periodically impact against each other, the combination of a continuously rotating driving member, a flywheel connected to the indicator, a pinion, coaxially and loosely mounted on said driving member and in gear engagement with said rotating wheel, and a spring, one end whereof is attached to said driving member, the other end being connected to said pinion.

3. With a speed indicator of the type comprising a wheel adapted to rotate in a continuous manner and in a constant direction, a balance wheel urged by a spiral spring in the reverse direction and two elements one of which is driven by said continuously rotating wheel and the other by said balance wheel, and adapted to periodically impact against each other, the combination of a continuously rotating driving member, a flywheel, a speed increasing gear operatively interposed between said flywheel and said rotating wheel, a pinion, coaxially and loosely mounted on said driving member and in gear engagement with said rotating wheel, and a spring one end whereof is attached to said driving member the other end being attached to said pinion.

In testimony whereof I have signed my name to this specification.

AUGUSTIN SEGUIN.